(12) United States Patent
Jeong et al.

(10) Patent No.: US 7,274,560 B2
(45) Date of Patent: Sep. 25, 2007

(54) LIQUID CRYSTAL DISPLAY DEVICE

(75) Inventors: Ki Ryoung Jeong, Kyongsangbuk-do (KR); Do Yune Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/449,782

(22) Filed: Jun. 9, 2006

(65) Prior Publication Data

US 2006/0227499 A1    Oct. 12, 2006

Related U.S. Application Data (62) Division of application No. 10/691,599, filed on Oct. 24, 2003, now Pat. No. 7,075,783.

(30) Foreign Application Priority Data

Dec. 24, 2002    (KR) ............. 10-2002-0083309

(51) Int. Cl.
*G01F 1/16*    (2006.01)

(52) U.S. Cl. ............... 361/681; 361/682; 345/87; 349/58

(58) Field of Classification Search ........ 361/679–681, 361/682–683, 724–727; 345/87, 143, 156, 345/903, 905; 349/1, 58–60; 248/917–924
See application file for complete search history.

(56) References Cited

U.S. PATENT DOCUMENTS

| 5,496,061 | A | 3/1996 | Brown |
| 5,568,357 | A * | 10/1996 | Kochis et al. ............. 361/681 |
| 6,128,183 | A | 10/2000 | Uchiyama et al. |
| 6,421,231 | B1 | 7/2002 | Jung |
| 6,452,206 | B1 | 9/2002 | Harman et al. |
| 6,507,377 | B1 * | 1/2003 | Jung ......................... 349/60 |
| 6,507,484 | B2 * | 1/2003 | Fukuyoshi ................. 361/681 |
| 6,559,907 | B1 * | 5/2003 | Byoun ........................ 349/58 |
| 6,654,078 | B1 * | 11/2003 | Kato et al. .................. 349/58 |
| 6,724,445 | B2 * | 4/2004 | Natsuyama ................. 349/58 |
| 6,812,976 | B2 * | 11/2004 | Satonaka ..................... 349/58 |
| 6,828,721 | B2 * | 12/2004 | Wakita ...................... 313/491 |
| 6,838,810 | B1 | 1/2005 | Bovio et al. |
| 6,859,357 | B2 | 2/2005 | Morimoto et al. |
| 6,876,409 | B2 | 4/2005 | Park et al. |
| 6,894,738 | B2 * | 5/2005 | Kasuga ....................... 349/58 |
| 6,919,937 | B2 * | 7/2005 | Kim et al. ................... 349/58 |
| 7,006,168 | B2 * | 2/2006 | Lee ............................. 349/58 |
| 2004/0066473 | A1 * | 4/2004 | Fukuwaki .................... 349/58 |

* cited by examiner

*Primary Examiner*—Michael Datskovskiy
(74) *Attorney, Agent, or Firm*—McKenna Long & Aldridge LLP

(57) ABSTRACT

An LCD device includes a joining structure for coupling a liquid crystal display module (LCM) and a front case and/or a back case without screws. The LCD device includes an LCM having at least one receiving part or at least one slot, and a bracket having at least one pin, or at least one joining part for securely coupling LCM and a back or front system case.

21 Claims, 7 Drawing Sheets

LIQUID CRYSTAL DISPLAY DEVICE

This application is a divisional of U.S. patent application Ser. No. 10/691,599, filed on Oct. 24, 2003 now U.S. Pat. No. 7,075,783, and claims the benefit of Korean Patent Application No. P2002-833091, filed on Dec. 24, 2002, which are hereby incorporated by both references for all purposes as if fully set forth herein.

BACKGROUND OF THE INVENTION

1. Field of the Invention

The present invention relates to liquid crystal display (LCD) devices, and more particularly, to structures for joining liquid crystal display modules (LCMs) and system cases of LCD devices.

2. Discussion of the Related Art

Due to recent improvements in liquid crystal materials and micro-fabrication technologies, LCD devices that are lightweight, have thin profiles, and consume relatively low amounts of power have been developed. Such LCD devices are currently used as display devices in various applications including slim and lightweight Notebook Personal Computers (NTPC).

Figure 1:
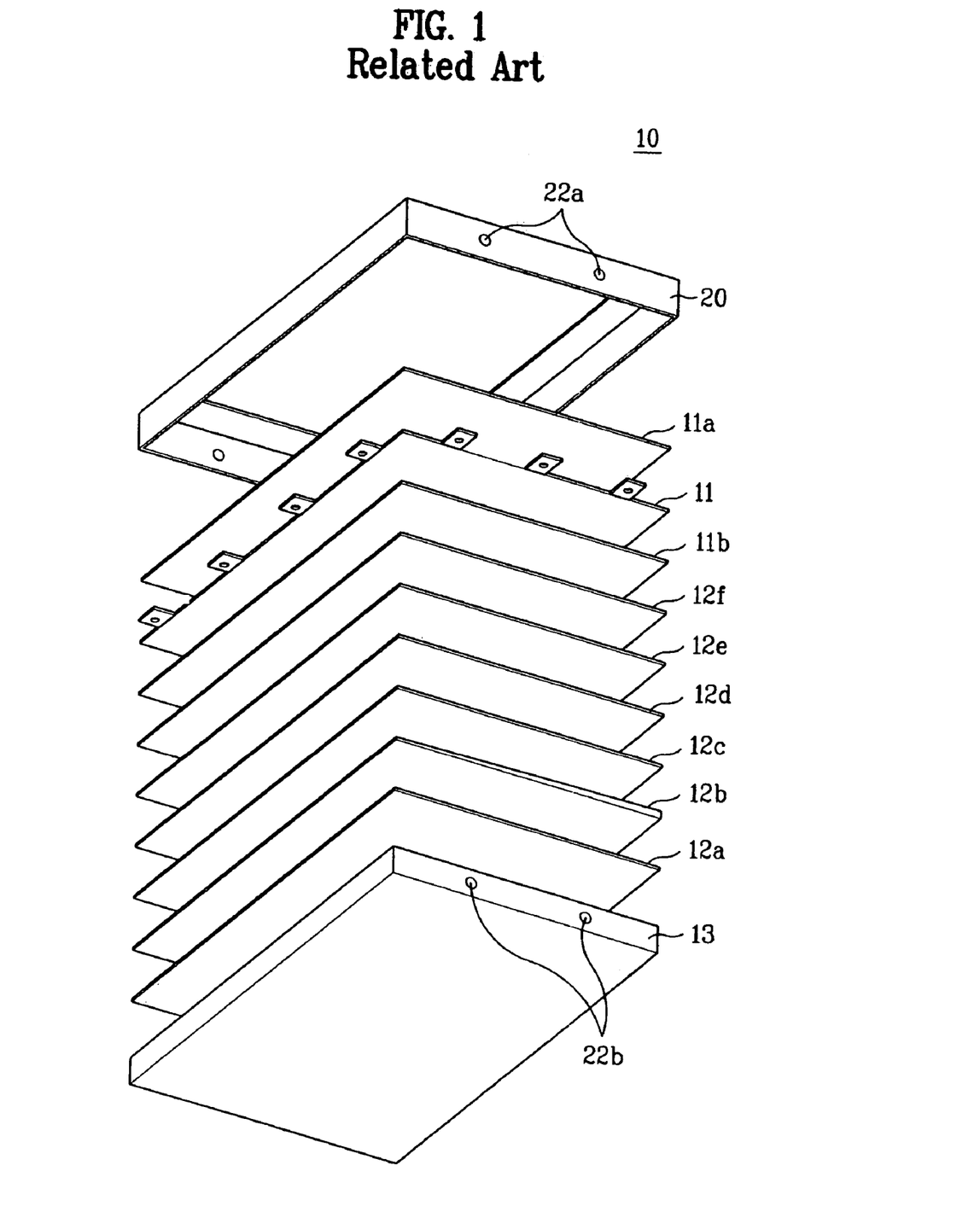
FIG. 1 illustrates an exploded perspective view of a related art liquid crystal module.

FIG. 1 illustrates an exploded perspective view of a related art LCM.

Referring to FIG. 1, liquid crystal display (LCD) devices typically include a liquid crystal display module (LCM) having a backlight unit 12 and an LCD panel 11 arranged between a main support 13, formed of a plastic material, and a top case 20, formed of a metal material. Components of the backlight unit 12 (e.g., a reflecting plate 12a, a light-guiding plate 12b, a first diffusing or protecting sheet 12c, a first prism sheet 12d, a second prism sheet 12e, and a second diffusing or protecting sheet 12f), in addition to a lower polarizing plate 11b, the LCD panel 11, and an upper polarizing plate 11a, are sequentially stacked on the main support 13. The top case 20 is typically arranged over the LCD panel 11 and surrounds edges of the main support 13 such that the top case 20 can be coupled to the main support 13.

Referring still to FIG. 1, a groove 22b is arranged within a side portion of the main support 13 to correspond with the arrangement of a hole 22a provided within the top case 20. Accordingly, when the top case 20 surrounds edges of the main support 13, the groove 22b is aligned with a corresponding hole 22a and a female screw part 22 is thereby formed, as shown in FIG. 2.

Figure 2:
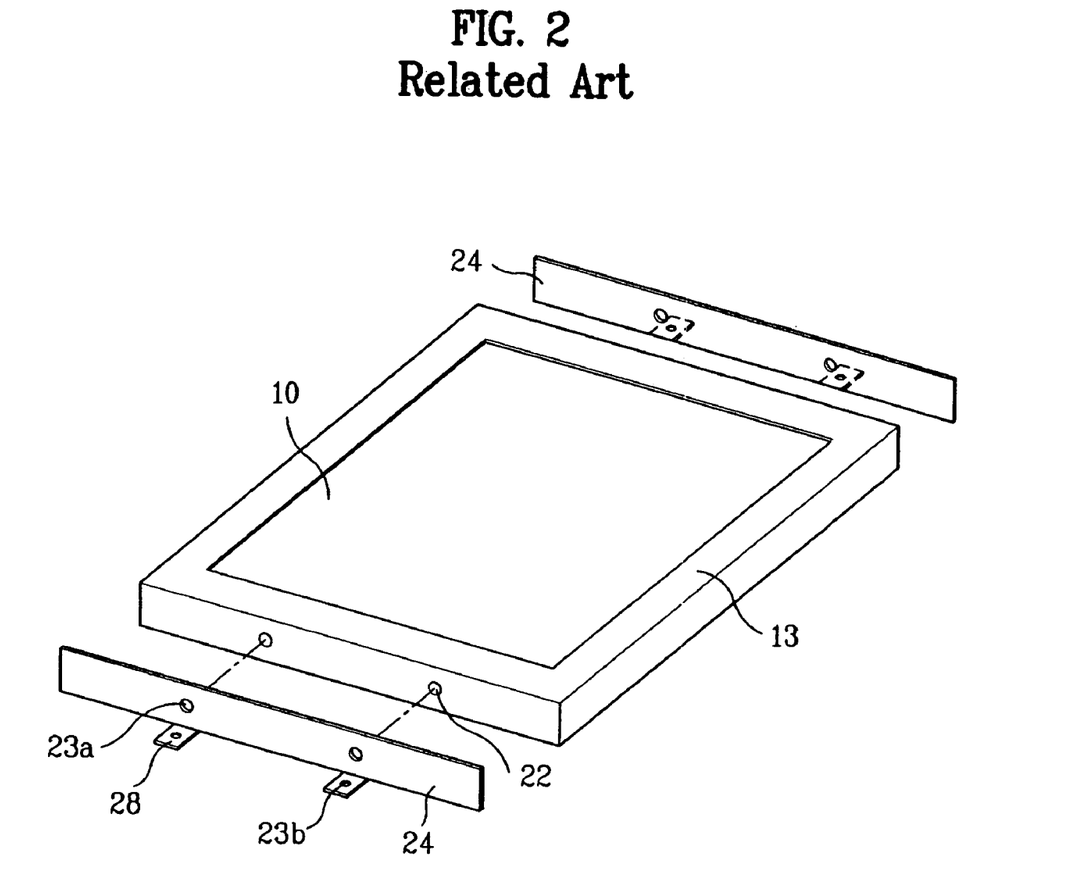
FIG. 2 illustrates a related art structure for joining a liquid crystal module to a system back case.

FIG. 2 illustrates a related art joining structure for joining a liquid crystal module to a system back case.

Referring to FIG. 2, the LCM 10 is joined to a system back case (not shown) by arranging a related art bracket 24 between the LCM 10 and the system back case. The related art bracket 24 is provided with pieces 28, wherein piece holes 23b are formed in the pieces 28, and holes 23a arranged to correspond with the arrangement of the female screw parts 22 within the LCM 10. To join the LCM 10 to the system back case, the bracket 24 is positioned on the LCM 10 such that the holes 23a are aligned with the female screw parts 22. Next, male screws (not shown) are inserted through the holes 23a into the female screw parts 22 to join the LCM 10 and the bracket 24 together. Subsequently, the system back case and the LCM 10 are joined together by aligning the piece holes 23b with the a structure (not shown) arranged on the system back case followed by inserting male screws (not shown) through the piece holes 23b and into the structure arranged on the system back case.

Joining the LCM 10 to the system back case as described above, however, is disadvantageous because the LCM 10 and the system back case must be joined to each other using screws. Accordingly, either additional fabrication equipment must be obtained or the male screws must be positioned manually and the cost of manufacturing the LCD device increases. Further, positioning and tightening the screws deleteriously increases the time required to manufacture the LCD device, thereby lowering the manufacturing yield of the process. Moreover, upon positioning and tightening, the screws often contact the plastic and metal materials of the of the main support 13 and top case 20 to generate foreign materials may be deleteriously generated. The presence of such foreign materials further lowers the manufacturing yield and quality of the LCD devices.

SUMMARY OF THE INVENTION

Accordingly, the present invention is directed to a liquid crystal display (LCD) device that substantially obviates one or more of the problems due to limitations and disadvantages of the related art.

An advantage of the present invention provides an LCD device including a joining structure between a liquid crystal module (LCM) and a system case.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include a system back case having at least one piece holder; an LCM having a at least one receiving part; and at least one bracket having at least one pin and at least one piece, wherein each pin may be coupled to a corresponding receiving part and wherein the piece may be coupled to a corresponding piece holder.

In one aspect of the present invention, the LCD device may further include a system front case having, for example, at least one protrusion for pushing the piece toward the piece holder.

In another aspect of the present invention, each pin may be provided as any of a circular, an oval, a polygonal, hollow tubular shape, or the like.

In still another aspect of the present invention, each piece may be provided as a plate shape.

In yet another aspect of the present invention, at least a portion of a pin may be coated with an elastic material such as rubber, or the like.

In still a further aspect of the present invention, a surface of the LCM may be contacted by at least one piece holder.

In yet a further aspect of the present invention, the system back case may further include a shaking prevention guide for preventing the LCM from being shaken and for reducing the degree to which the LCM experiences an external shock.

In still a further aspect of the present invention, the shaking prevention guide may be formed of a hard material, the LCM and the shaking prevention guide may be spaced apart by a predetermined distance, and an elastic material may be provided within the space between the LCM and the shaking prevention guide.

In accordance with the principles of the present invention, an LCD device may, for example, include an LCM having at least one slot; and a system front case having at least one joining part arranged in correspondence with a respective the slot.

In one aspect of the present invention, at least one joining part may be provided as a hook shape.

In another aspect of the present invention, the LCM may, for example, include a top case and a main support, wherein at least one slot may be provided within the top case and within the main support.

In still another aspect of the present invention, at least one joining part may be provided through the top case and the main support to secure the top case relative to the main support.

In yet another aspect of the present invention, each joining part may be formed of a metal material having a predetermined elasticity.

In still a further aspect of the present invention, at least one joining part may be slidably arrangable within a respective slot, wherein the LCM and the system front case are joinable to each other via a joining part arranged within a slot.

In yet a further aspect of the present invention, the system front case may, for example, include a shaking prevention guide for preventing the LCM from being shaken and for reducing the degree to which the LCM experiences an external shock.

In still a further aspect of the present invention, the shaking prevention guide may be formed of a hard material, the LCM and the shaking prevention guide may be spaced apart by a predetermined distance, and an elastic material may be provided within the space between the LCM and the shaking prevention guide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 3:
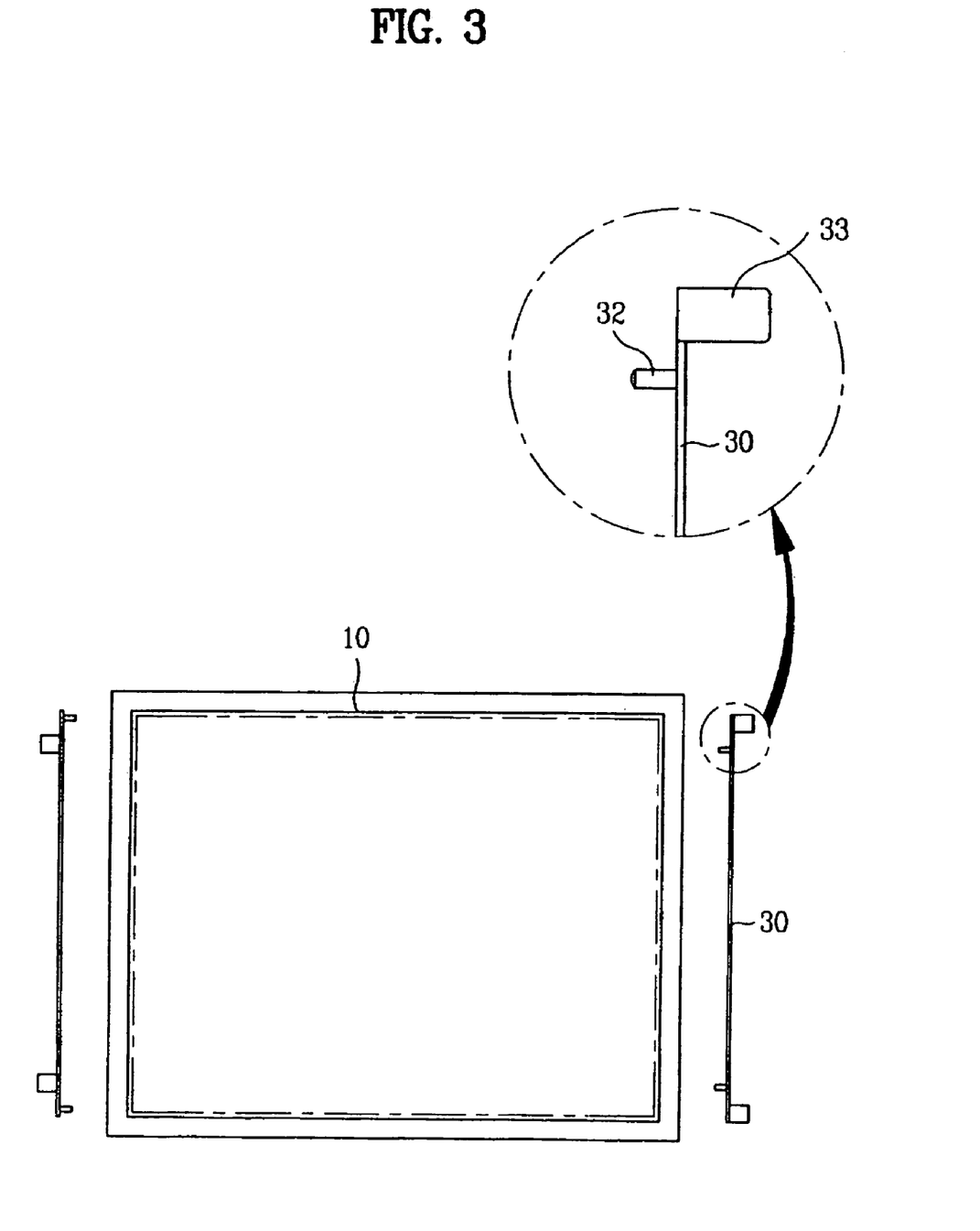
FIG. 3 illustrates a structure for joining a liquid crystal module to a system back case according to principles of a first aspect of the present invention.
Figure 4:
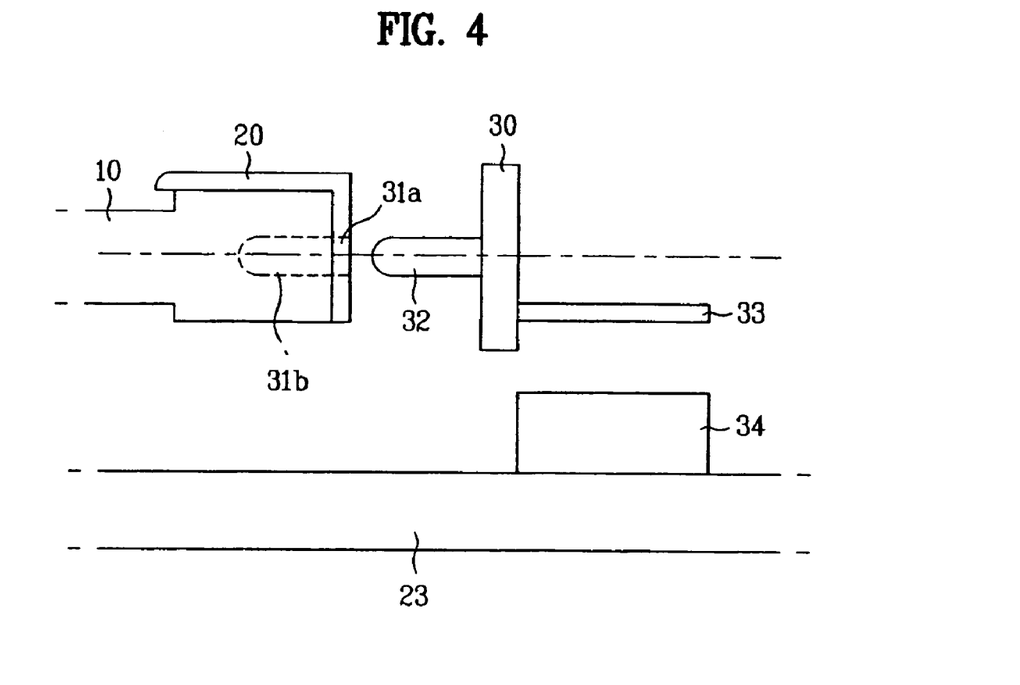
FIG. 4 illustrates a cross-sectional view of the structure shown in FIG. 3.

FIG. 3 illustrates a structure for joining a liquid crystal module to a system back case according to principles of a first aspect of the present invention. FIG. 4 illustrates a cross-sectional view of the structure shown in FIG. 3.

Referring generally to FIGS. 3 and 4, an LCD device may, for example include an LCM 10, at least one bracket 30, and a system back case 23. In one aspect of the present invention, the LCM 10, bracket 30, and system back case 23 may be detachably coupled to each other. The bracket 30 may include at least one pin 32 and at least one piece 33. In one aspect of the present invention, at least one bracket 30 may include at least two pins 32 and at least two pieces 33. In another aspect of the present invention, the pins 32 and pieces 33 may be arranged a opposing ends of at least one bracket 30. As will be described in greater detail below, the LCM 10 may include at least one receiving part for receiving at least one pin 32 where, upon receipt of the pin 32 by the receiving part, the pin 32 supports the LCM 10 and the bracket 30 may be detachably coupled to the LCM 10. Further, and as will be described in greater detail below, the system back case 23 may include at least one piece holder 34 for receiving at least one piece 33, wherein upon receipt of the piece 33 by the piece holder 34, the bracket may be detachably coupled to the system back case 23.

Referring to FIG. 3, the LCM 10 may include first and second pairs of opposing sides. In one aspect of the present invention, a bracket 30 may be detachably coupled any side of the first or second pair of opposing sides of the LCM 10. In another aspect of the present invention, brackets 30 may be detachably coupled to the first or second pair of opposing sides. In still another aspect of the present invention, brackets 30 may be detachably coupled to one side of each of the first and second pair of opposing sides of the LCM 10.

Referring to FIG. 4, the system back case 23 may, for example, include a lower panel for covering a rear side of the LCD device. In one aspect of the present invention, the system back case 23 may further include a supporter for supporting a rear of the LCM 10.

The LCM 10 may include a main support 13, formed from a material such as a plastic, and a top frame 20, formed from a material such as a metal, for supporting the LCM 10, wherein the main support 13 and the top frame 20 may be collectively referred to as support frames. The receiving part described above may, for example, include at least one groove 31b arranged within a side portion of the main support 13 in correspondence with the arrangement of at least one hole 31a provided within the top frame 20. In one aspect of the present invention, the top frame 20 may be arranged to surround edges of the main support 13. Accordingly, when the top frame 20 surrounds edges of the main support 13, each groove 31b may. be substantially aligned with a respective hole 31a, thereby forming the receiving part. In one aspect of the present invention, the receiving part may include at least two holes 31a and at least two grooves 31b.

A method by which the LCM 10 and the system back case 23 may be detachably coupled together will be now described in greater detail.

In one aspect of the present invention, the LCM 10 and the system back case 23 may be detachably coupled together by inserting the pin 32 through a hole 31a and into a corresponding groove 31b, substantially aligned with respect to each other, followed by detachably coupling the piece 33 to the piece holder 34. Upon inserting the pin 32 through the hole 31a and into the groove 31b, the LCM 10 becomes detachably coupled to the bracket 30. Further, upon inserting the pin 32 through the hole 31a and into the groove 31b, the LCM 10 may be substantially prevented from being shaken.

According to the principles of the present invention, the pin 32 may be arranged on the bracket 30 in substantial correspondence with arrangement of the grooves 31b and holes 31a of the receiving part of the LCM 10. The pin 32 may be formed of an elastic material or a hard material. If the pin 32 is formed of the hard material, at least a portion of the pin 32 may be covered with an elastic material such as rubber, or the like. In another aspect of the present invention, the surface of the pin 32 may be provided with one or more projections or shapes for improving friction between the pin 32 and the LCM 10 and for realizing a stable coupling of the pin 32 and the receiving part.

According to the principles of the present invention, the length of each pin 32 may substantially correspond to the sum of the depth of the groove 31b and the thickness of the hole 31a. In one aspect of the present invention, an end portion of the pin 32 may be thicker than other portions along the length of the pin 32. In another aspect of the present invention, the end portion of the pin 32 may be covered with an elastic material such as rubber. In another aspect of the present invention, internal dimensions of the grooves 31b may substantially conform to the external dimensions of the pins 32 to realize a secure coupling of the bracket 30 and the LCM 10. In still another aspect of the present invention, the pin 32 may be provided as any of a circular, oval, polygonal, hollow tubular shapes, or the like.

As mentioned above, the bracket 30 may be detachably coupled to the LCM 10, wherein each pin 32 of a bracket in insertable and removable from the receiving part of the LCM 10. However, in one aspect of the present invention, at least one pin 32 and the main support 13 may be formed of a conductive material and may therefore be immovably coupled to each other. For example, a pin 32 and the main support 13 may be immovably coupled to each other by spot welding each pin 32 within a respective groove 31a. Accordingly, as an LCD panel (not shown) can be sensitive to electrical stimulation, the LCD panel must be insulated from the main support 13.

In one aspect of the present invention, the LCM 10 may be detachably coupled to the system back case 23 after the bracket 30 has been coupled to the LCM 10. Accordingly, the LCM 10, coupled to at least one bracket 24, may be joined to the system back case 23 by coupling the piece 33 to the piece holder 34.

Figure 5:
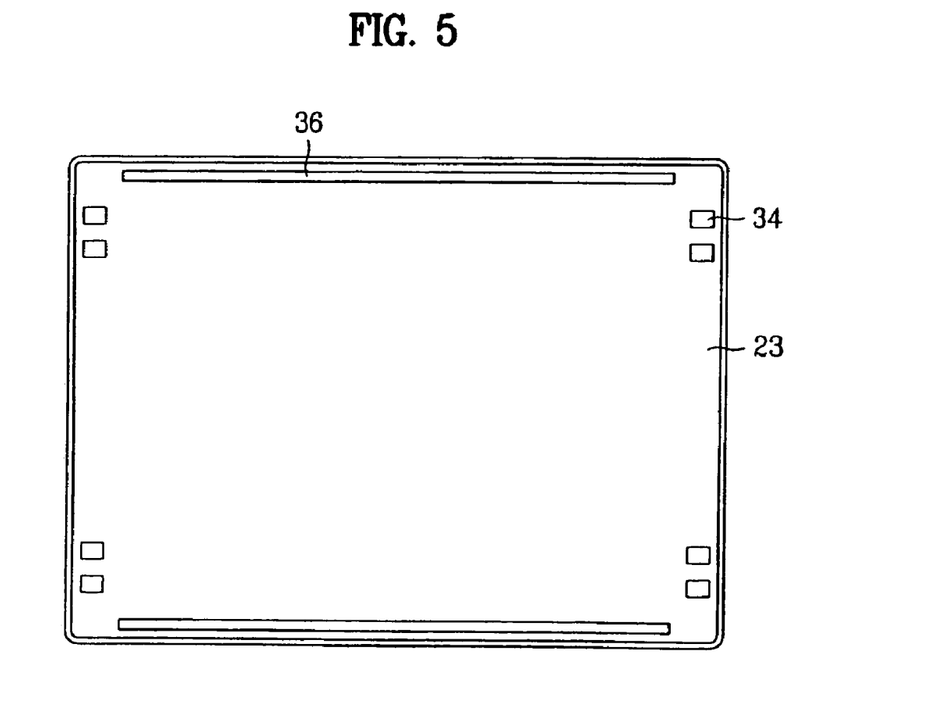
FIG. 5 illustrates a plan view of a system back case according to principles of the first aspect of the present invention.

FIG. 5 illustrates a plan view of a system back case according to principles of the first aspect of the present invention.

Referring to FIG. 5, at least one piece holder 34 may be formed at predetermined regions of the system back case 23 for receiving a respective piece 33. In one aspect of the present invention, at least two piece holders 34 may be arranged on the system back case 23. In another aspect of the present invention, piece holders 34 may be formed at each corner of the system back case 23. In another aspect of the present invention, piece holders 34 may be arranged at center portions of predetermined sides of the system back case, in correspondence with the arrangement of brackets 30 on the LCM 10. Although not shown, the LCD device may further include a system front case having at least one protrusion for pushing at least one piece 33 toward a respective piece holder 34.

Figure 6:
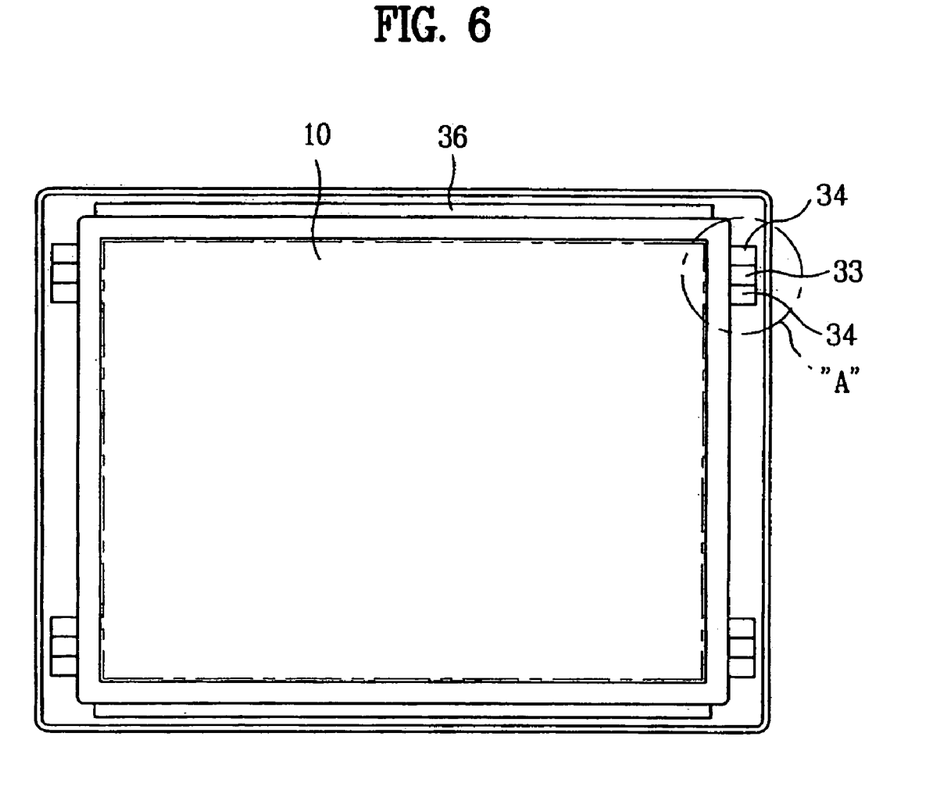
FIG. 6 illustrates a liquid crystal module joined to a system back case according to principles of the first aspect of the present invention.
Figure 7:
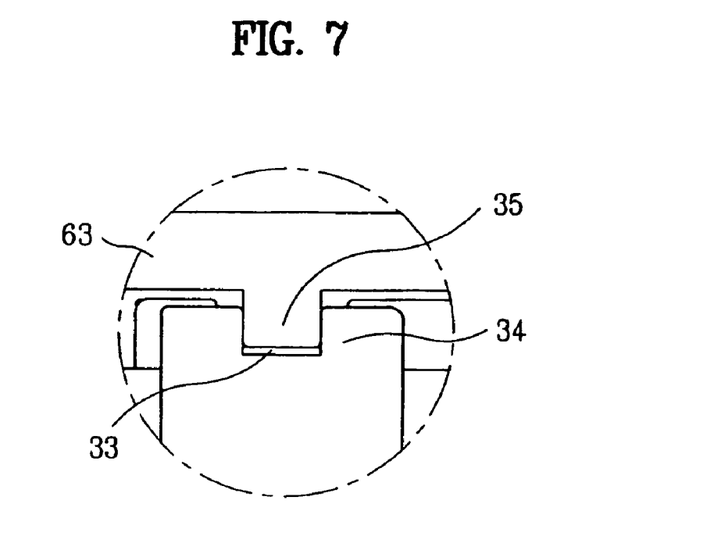
FIG. 7 illustrates a side view corresponding to region "A" shown in FIG. 6.

FIG. 6 illustrates a liquid crystal module joined to a system back case via a joining structure according to principles of the first aspect of the present invention. FIG. 7 illustrates a side view corresponding to region "A" shown in FIG. 6, wherein the joining structure is arranged between the system back case and a system front case according to principles of the first aspect of the present invention.

Referring to FIGS. 6 and 7, each piece holder 34 may be arranged on the system back case in correspondence with a respective piece 33 of a bracket 30. According to the principles of the present invention, the piece 33 may be detachably coupled to the piece holder 34 by any of various methods. In one aspect of the present invention, the piece holder 34 may include a recess having a size and shape suitable for receiving a corresponding piece 33. In one aspect of the present invention, the width of the recess may gradually decrease from a lower region of the piece holder 34 to an upper region of the piece holder 34. For example, the portion of the recess at the upper region of the piece holder 34 may be smaller than the portion of the recess at the lower region of the piece holder 34. In one aspect of the present invention, at least a portion of a piece 33 and corresponding piece holder 34 may be coated with an elastic material such as rubber to ensure the piece 33 is securely received by the piece holder 34. In another aspect of the present invention, at least one piece holder 34 may be formed of an elastic material. Accordingly, each piece 33 may be securely received within a respective piece holder 34 via elastic characteristics of the materials they are formed of.

According to the principles of the present invention, each piece 33 may be provided as a rectangular plate or may have circular, oval, polygonal, or hollow tubular shapes. For example, and in reference to FIG. 7, a piece 33 may have a substantially rectangular, flat cross-section that is substantially conformal to dimensions of the recess within the piece holder 34. When the piece 33 is received within the recess of the piece holder 34, the LCM 10 may be substantially prevented from being shaken.

According to the principles of the present invention, the arrangement and number of pieces 33 on the bracket 30 may substantially correspond with the number and arrangement of piece holders 34. The piece 33 may be formed of an elastic material. In one aspect of the present invention, the surface of the piece 33 may be provided with one or more projections or shapes for improving friction between the piece 33 and the piece holder 34 and for realizing a stable joining of the piece 33 and the piece holder 34.

As mentioned above, at least one piece 33 may be detachably coupled to the piece holder 34, wherein each piece 33 is receivable by a corresponding piece holder 34. However, in one aspect of the present invention, the piece 33 and the piece holder 34 may be formed from conductive materials and may therefore be immovably coupled to each other via a spot welding process. Accordingly, as an LCD panel (not shown) can be sensitive to electrical stimulation, the LCD panel must be insulated from the piece 33.

Referring still to FIG. 7, after the LCM 10 and the system back case 23 have been coupled to each other, a system front case 63 may be provided over the LCM 10 and system back case 23. In one aspect of the present invention, the system front case 63 may include at least one protrusion 35 for pushing a piece 33 into the recess of a respective piece holder 34. Accordingly, protrusions 35 may be arranged at side regions of the system front case 63 in correspondence with the arrangement of the pieces 33 arranged on the system back case 23. In one aspect of the present invention, the protrusion 35 may have a cross-sectional shape capable of being received within the recess of the piece holder 34. Accordingly, when provided over the LCM 10 and system back case 23, the protrusion 35 may be partially inserted into the recess of the piece holder 34, ensuring that the piece 33 is securely received within the recess. According to the principles of the present invention, the system front case 63 and the system back case 23 may be joined to each other by various methods. Upon joining the system front and back cases 63 and 23 together, the piece 33 may be securely coupled to a respective piece holder 34.

Referring back to FIG. 6, a shaking prevention guide 36 may be arranged on the system back case 23 for preventing the LCM 10 from being shaken in vertical directions (e.g., up and down directions). Further, the piece holder 34 may contact a surface of the LCM 10 such that the piece holder 34 substantially prevents the LCM 10 (including the support frames) from being shaken in horizontal directions (e.g., left and right directions). In one aspect of the present invention, a side of at least one piece holder 34 may be adhered to the LCM 10 to prevent the LCM 10 from being shaken.

According to the principles of the present invention, the shaking prevention guide 36 may be formed of an elastic material to absorb an external shock. Accordingly, the shaking prevention guide 36 may substantially prevent the LCM 10 from being shaken in the absence of an external shock. In the presence of an external shock, however, the elastic material of the shaking prevention guide 36 may absorb the external shock and reduce the external shock experienced by the LCM 10.

In another aspect of the present invention, the shaking prevention guide 36 and the piece holder 34 may be formed of a hard material. In such a case, an elastic material may be provided (e.g., inserted, injected, etc.) within a space between the LCM 10 and the shaking prevention guide 36. Further, an elastic material may be provided (e.g., inserted, injected, etc.) within a space between the LCM 10 and the piece holder 34. Accordingly, one side of the elastic material may adhere to the shaking prevention guide 36 to prevent shaking of the LCM 10 and to reduce the degree to which the LCM 10 experiences external shock. According to the principles of the present invention, shaking of the LCM 10 may be substantially prevented by various methods.

An LCD device in accordance with principles of the second aspect of the present invention will now be described with reference to the FIGS. 8-11.

Figure 8:
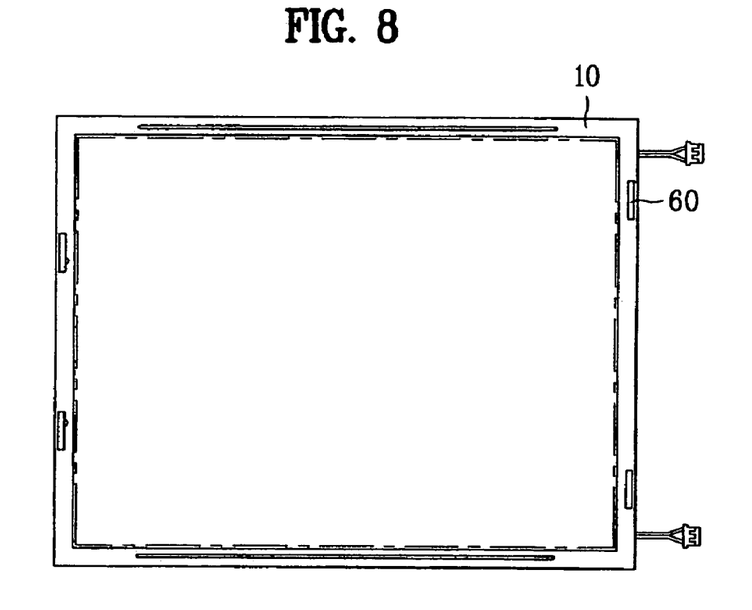
FIG. 8 illustrates a plan view of a liquid crystal module having at least one slot according to principles of a second aspect of the present invention.
Figure 9:
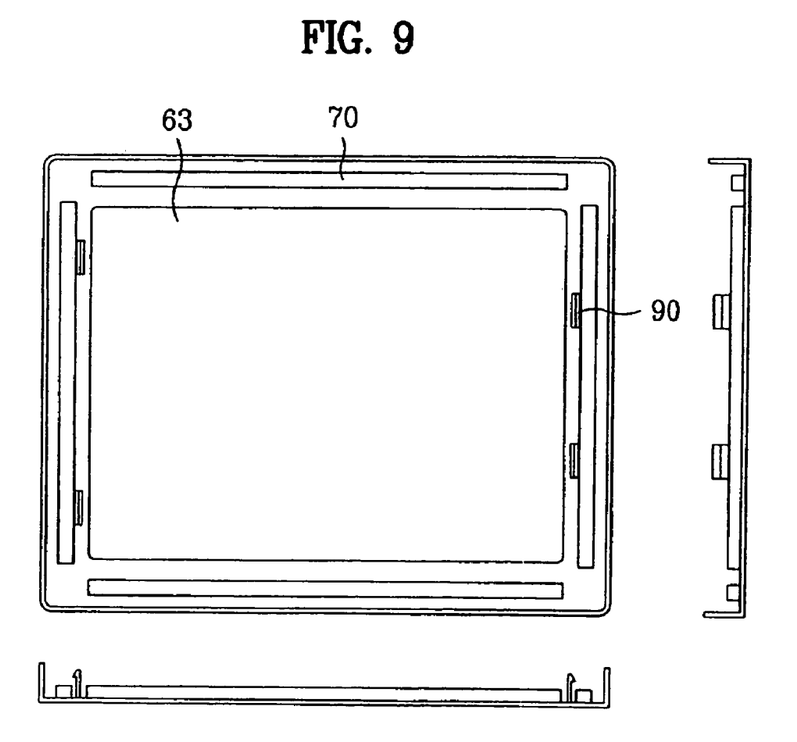
FIG. 9 illustrates schematic views of a system front case having at least one joining part arrangeable in correspondence with a respective slot according to principles of the second aspect of the present invention.
Figure 10:
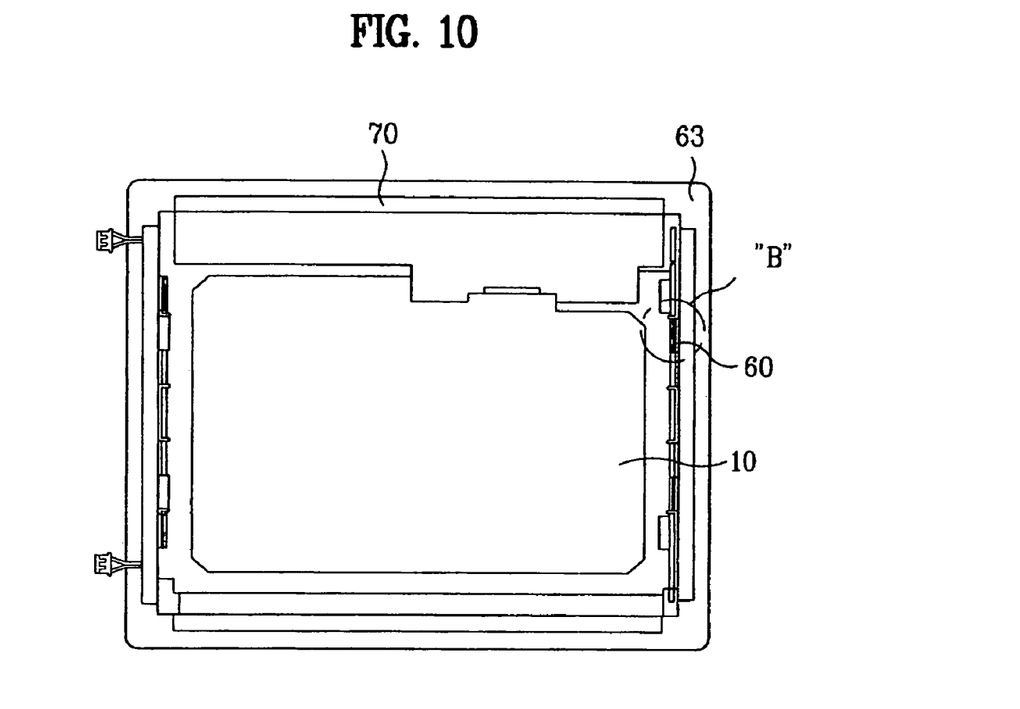
FIG. 10 illustrates a rear view of the system front case having at least one joining part arranged in correspondence with a respective slot of the liquid crystal module, according to principles of the second aspect of the present invention.

FIG. 8 illustrates a plan view of a liquid crystal module having at least one slot according to principles of a second aspect of the present invention. FIG. 9 illustrates schematic views of a system front case having at least one joining part arrangeable in correspondence with at least one slot according to principles of the second aspect of the present invention. FIG. 10 illustrates a rear view of the system front case having at least one joining part arranged in correspondence with at least one slot of the liquid crystal module, according to principles of the second aspect of the present invention.

Referring generally to FIGS. 8-10, an LCD device may, for example, include an LCM 10 and a system front case 63. In one aspect of the present invention, the LCM 10 may be detachably coupled to each other. The LCM 10 may include at least one slot 60 and the system front case 63 may include at least one joining part 90 arranged in correspondence with a respective slot 60.

The LCM 10 may include first and second pairs of opposing sides. Moreover, the LCM 10 may, for example, include a main support 13 and a top frame 20 for supporting the LCM 10, wherein the main support and the top frame may be collectively referred to as support frames.

In one aspect of the present invention, the slot 60 may be formed through the combined thickness of the support frames, in front and rear surface of the LCM 10. In another aspect of the present invention, the slot 60 may be formed in any of a rectangular, polygonal, oval, circular shape, or the like. In another aspect of the present invention, at least one slot 60 may be formed within any side of the first or second pair of opposing sides of the LCM 10. In another aspect of the present invention, slots 60 may be formed in the first or second pair of opposing sides. Further, at least one slot 60 (e.g., one, two, three, etc.) may be provided within any of the sides of the LCM 10. In yet another aspect of the present invention, the slots 60 may be arranged at corner regions of the LCM 10 (e.g., at end regions of the sides) or at center regions of the sides of the LCM 10, or combinations thereof.

Referring to FIG. 9, a shaking prevention guide 70 may be arranged at the vertically opposed sides, or at horizontally opposed sides of the system front case 63, or at combinations thereof, to substantially prevent the LCM 10 from being shaken when joining the system front case 63 to the LCM 10.

For example, and in a manner similar to that described above with respect to the principles of the first aspect of the present invention, the principles of the second aspect of the present invention may include a shaking prevention guide arranged in the system front case 63. Accordingly, when the LCM 10 is joined to the system front case 63, the shaking prevention guide 70 may substantially prevent the LCM 10 and the system front case 63 from being shaken in vertical directions. Different from principles of the first aspect of the present invention, however, an additional shaking prevention guide may be arranged on the system front case 63 for preventing the LCM 10 from being shaken in horizontal directions.

In one aspect of the present invention, the shaking prevention guide 70 may be formed of an elastic material to absorb an external shock. Accordingly, the shaking prevention guide 70 may prevent the LCM 10 from being shaken in the absence of an external shock. In the presence of an external shock, however, the elastic material of the shaking prevention guide 70 may absorb the external shock and reduce the external shock experienced by the LCM 10.

In another aspect of the present invention, the shaking prevention guide 70 may be formed of a hard material and an elastic material may be inserted into an interval between a space provided between the LCM 10 and the shaking prevention guide 70. Accordingly, one side of the elastic material may adhere to the shaking prevention guide 70 to prevent shaking of the LCM 10 and to reduce the degree to which the LCM 10 experiences external shock. Moreover, the number and arrangement of shaking prevention guides 70 may be substantially controlled as required. In one aspect of the present invention, shaking of the LCM 10 may be substantially prevented by various methods.

In one aspect of the present invention, at least one hook-shaped joining part 90 may be arranged on a rear side of the system front case 63 in correspondence with a respective slot 60 arranged within the LCM 10. In one aspect of the present invention, each hook-shaped joining part 90 may pass through the length of the respective slot 60 from a front side of the LCM 10 to a rear side of the LCM 10 to detachably couple the system front case 63 to the LCM 10. In another aspect of the present invention, at least one joining part 90 may be formed on a front side of a system back case (not shown), whereby each joining part 90 may pass through the length of the respective slot 60 from a rear side of the LCM 10 to a front side of the LCM 10 to detachably couple the system back case to the LCM 10.

Referring to FIG. 10, the joining part 90 of LCM 10 may, for example, be detachably coupled to a respective slot 60 by sliding the joining part 90 into the respective slot 60. Accordingly, the LCM 10 may be detachably coupled to the system front case 63 by holding a top frame 20 and the main support 13. In one aspect of the present invention, the LCM 10 may be joined to the system front case 63 by sliding the hook-shaped fixing part 90 into a corresponding slot 60. An inner surface of the slot 60 may be substantially flat such that joining part 90 may fully extend through the slot 60 and be joined with the LCM 10. After joining the system front case 63 to the LCM 10, the system back case 23 may be joined to the system front case 63 by substantially any suitable method.

Figure 11:
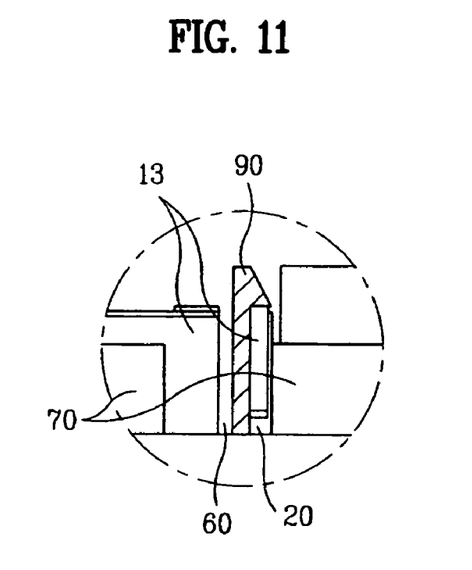
FIG. 11 illustrates a side view corresponding to region "B" shown in FIG. 10.

FIG. 11 illustrates a side view corresponding to region "B" shown in FIG. 10 wherein at least one joining part is arranged in correspondence with at least one slot according to principles of the second aspect of the present invention. As shown in FIG. 11, at least one joining part 90 may, for example, be provided in the aforementioned hook shape. In another aspect of the present invention, however, each joining part 90 may be formed in substantially any shape so as to correspond with the shape of a respective slot 60. In one aspect of the present invention, at least one joining part 90 may be formed of a metal material having suitable elastic characteristics to prevent the joining part from becoming cracked or damaged due to external shocks, shaking, or other stresses encountered during use and manufacturing.

As described above, the principles of the first and second aspects of the present invention as described above, may be applied to form structures capable of coupling either a system front case or a system back case to an LCM without the use of screws. By coupling the LCM to the system case without screws, the components of the LCD device may be coupled together efficiently and simply.

According to the principles of a third aspect of the present invention, a system back case similar to the previously described system back case 23 may be joined to an LCM similar to the previously described LCM 10 using the joining structure of the first aspect of the present invention while the system back case, a system front case, and the LCM may be joined to one another using the joining structure of the second aspect of the present invention.

For example, the system back case 23 may be joined to the LCM 10 using the bracket 30 having the pin 32 and piece 33 substantially as described above. Accordingly, the pin 32 of the bracket 30 may be inserted into the hole 31a and through groove 31b while and the piece 33 may be securely received within the piece holder 34 of the system back case 23 such that the LCM 10 may be coupled to the system back case 23. Further, each joining part 90 arranged on a system front case, similar to the system front case 63 described above, may pass through slots formed within the LCM 10, substantially as described above. In the present aspect, however, at least one joining part 90 may also pass through a slot arranged in correspondence within the system back case 23. Accordingly, the LCM 10 may be securely coupled to the system back case 23 and to the system front case 63. In another aspect of the present invention, the at least one joining part 90 may be arranged on the system back case 23 and pass through slots 60 formed within the LCM 10 and the system front case 63, whereby the joining part 90 formed arranged on the system back case may securely couple the LCM 10 to the system front case 63 and the system back case 23.

Further, and as similarly described above with respect to principles of the first aspect of the present invention, a projection 35 may be arranged on the system front case 63 in correspondence with the piece 33 arranged within the piece holder 34 of the system back case 23. Accordingly, the piece 33 may be securely received within the recess of the piece holder 34 due to the presence of the projection 35 when the system front case 63 is arranged over the LCM 10. In one aspect of the present invention, the projection 35 may have substantially any cross-sectional shape suitable for receipt by the piece holder 34.

In accordance with the principles of the present invention, the system back case 23 and the system font case 63 in the aspects described above may be joined to each other via screws or by substantially any other suitable method. A process by which the screws may be tightened, however, may be different from the aforementioned related art screwing process for the joining the LCM.

As mentioned above, the LCD device includes an LCM joinable to a system case without the use of screws. Accordingly, the LCD device of the present invention is advantageous because the LCM joinable to other components such as the system case by insertion and holding methods. Accordingly, the introduction of foreign materials into the LCD manufacturing process may be substantially prevented from occurring, thereby improving the yield of the manufacturing process and the quality of the LCD device. Further, LCD device components such as the front and back system cases may be detachably coupled to each other on the LCM.

Unlike the related art method where screws are used to join LCMs and system cases to each other, the joining method of the present invention does not require additional equipment, material cost, or manual processes to position screws, thereby improving production yield and decreasing manufacturing cost and time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
    a liquid crystal module (LCM) having at least one slot;
    a system front case; and
    at least one joining part arranged on the system front case, wherein each joining part is arranged on the system front case in correspondence with a respective slot,
    wherein the at least one joining part passes through the respective slot extending from a front side to a rear side of the liquid crystal module to engage the rear side of the liquid crystal module.

2. The LCD device of claim 1, wherein at least one joining part is provided as a hook shape.

3. The LCD device of claim 1, wherein the LCM further comprises:
a top case; and
a main support,
wherein at least one slot is formed within the top case and within the main support.

4. The LCD device of claim 3, wherein the at least one joining part passes through the at least one slot formed within the top case and the main support.

5. The LCD device of claim 1, wherein the joining part is formed of a metal material having a predetermined elasticity.

6. The LCD device of claim 1, wherein at least one joining part is slidably arrangeable within at least one slot.

7. A liquid crystal display (LCD) device, comprising:
a liquid crystal module (LCM) having at least one slot;
a system front case; and
at least one joining part arranged on the system front case,
wherein each joining part is arranged on the system front case in correspondence with a respective slot,
wherein the system front case includes a shaking prevention guide for preventing the LCM from being shaken.

8. The LCD device of claim 7, wherein the shaking prevention guide is formed of a hard material.

9. The LCD device of claim 8, wherein the shaking prevention guide and the LCM are spaced apart by a predetermined distance.

10. The LCD device of claim 9, further comprising an elastic material arranged within the space between the shaking prevention guide and the LCM.

11. A display device, comprising:
a system case;
a display module connectable to the system case;
at least one bracket, the at least one bracket being connectable to the display module and the system case;
at least one joining part arranged on the system case, wherein each joining part is arranged on the system case in correspondence with a respective slot; and
at least one shaking prevention guide attached to the system case and in contact with the display module for preventing the display module from being shaken.

12. A display device, comprising:
a system case;
a display module connectable to the system case; and
at least one shaking prevention guide attached to the system case and in contact with the display module for preventing the display module from being shaken,
further comprising at least one bracket, the at least one bracket being connectable to the display module and the system case.

13. The display device according to claim 12, wherein the display module includes at least one receiving part; the system case includes at least one piece holder; and
at least one bracket includes at least one pin and at least one piece,
wherein the at least one pin is receivable by the at least one receiving part and at least one piece is receivable by at least one piece holder.

14. The display device according to claim 13, wherein the display module comprises; a main support including at least one groove; and
a top case including at least one hole,
wherein at least one receiving part comprises corresponding ones of the groove and hole.

15. The display device according to claim 13, wherein at least one piece holder includes a recess, wherein at least one piece is receivable by at least one piece holder.

16. The display device according to claim 13, wherein at least one piece holder contacts the display module.

17. A display device, comprising:
a system case;
a display module connectable to the system case; and
at least one shaking prevention guide attached to the system case and in contact with the display module for preventing the display module from being shaken,
wherein
the display module comprises at least one slot; and
the system case comprises at least one joining part, wherein at least one joining part is receivable by at least one slot.

18. A display device, comprising:
a system case;
a display module connectable to the system case; and
at least one shaking prevention guide attached to the system case and in contact with the display module for preventing the display module from being shaken,
further comprising at least one bracket, the at least one bracket being connectable to the display module and the system case, wherein the system case includes a system front case and a system back case; at least one slot arranged within the system front case; and at least one joining part arranged on the system back case, wherein at least one joining part is receivable by at least one slot.

19. The display device according to claim 18, further comprising at least one slot arranged within the display module, wherein at least one joining part is receivable by at least one slot within the display module.

20. A display device, comprising:
a system case;
a display module connectable to the system case; and
at least one shaking prevention guide attached to the system case and in contact with the display module for preventing the display module from being shaken,
further comprising at least one bracket, the at least one bracket being connectable to the display module and the system case, wherein the system case includes a system front case and a system back case; at least one slot arranged within the system back case; and
at least one joining part arranged on the system front case, wherein at least one joining part is receivable by at least one slot.

21. The display device according to claim 20, further comprising at least one slot arranged within the display module, wherein at least one joining part is receivable by at least one slot within the display module.

* * * * *